March 26, 1968     Z. SZOHATZKY     3,375,026

TUBE COUPLING

Filed Oct. 21, 1965

INVENTOR.
ZOLTAN SZOHATZKY

BY *Fay & Fay*

ATTORNEYS

United States Patent Office 3,375,026
Patented Mar. 26, 1968

3,375,026
TUBE COUPLING
Zoltan Szohatzky, Mentor Township, Ohio, assignor to Crawford Fitting Company, Solon, Ohio, a corporation of Ohio
Filed Oct. 21, 1965, Ser. No. 499,433
1 Claim. (Cl. 285—322)

ABSTRACT OF THE DISCLOSURE

A wedge type tube coupling for miniaturized tubing. The coupling comprises a body member having a fluid passageway therethrough. A longitudinally extending gripping element integral with said body member is defined by an external tapered surface extending from the body to a free end of the gripping element. Adjacent the gripping element there is defined an external circular cylindrical surface. A circular cylindrical bore is defined in the gripping element to receive a tube. An annular coupling member is disposed about the tube. The annular coupling member is defined by a circular cylindrical bore having a diameter substantially equal to the outside diameter of the tube plus twice the transverse thickness of the free end of the gripping element. The annular coupling member is also defined by a counterbore having a diameter substantially equal to the diameter of the external circular cylindrical surface of the body. A tapered mouth portion is defined in the annular coupling member interconnecting the counterbore with the bore. Upon advancement of the coupling member over the external cylindrical surface of the body, mating engagement of the tapered surface of the body and the tapered mouth portion of the annular coupling member takes place to thereby deform the gripping element into engagement with the exterior of the tubing. Since the length of the tapered mouth portion of the annular coupling member is less than the length of the tapered surface of the body, full advancement of the coupling member over the external cylindrical surface of the body will cause the free end of the gripping element to be received within the bore of the annular coupling member.

---

This invention relates to tube couplings and more particularly to a wedge type coupling adapted to be used in connection with gas chromatography equipment.

Gas chromatography is a practical laboratory procedure for separating materials in the gas phase. In a typical gas chromatography system, tubing having an outside diameter in the order of 1/16 inch frequently is used. To interconnect the tubing to the gas chromatography equipment, it is necessary to utilize specially designed, miniaturized fittings or micro-couplings. The extreme miniaturization required in the design of such fittings has presented substantial problems. Thus, it is necessary to provide a coupling which will securely grip fine tubing to provide a leak tight joint, but one which will not damage the tubing in the coupling action.

In addition, since experimental and instrumentation systems such as gas chromatography are often used for a variety of fluids, it frequently becomes necessary to purge the system of unwanted gases before introduction of a different gas. In the interest of a complete purging, design considerations demand the elimination of the crevices, pockets and the like which would serve to trap the unwanted gas despite the purging operation. The coupling of the instant embodiment fulfills this design requirement in that the dead space in the interior of the fitting is minimized along with the elimination of crevices, traps, pockets and the like. In the instant invention, the fluid passages are of simple, smooth design and are provided with strategically placed tubing seats designed to preclude fluid contact with threads and like structure which would make a complete purging difficult at best.

An additional design requirement is that the coupling, to be used effectively in an experimental system, must be capable of installation with a minimum of difficulty, so that a particular setup may be altered according to the particular need on any specific analysis.

An additional problem which is inherent in a system utilizing tubing of such small dimensions is the requirement that the coupling must be capable of being connected to the tubing without imposing any longitudinal stresses on the tubing.

It is an object of this invention to provide an improved micro-coupling.

It is another object of this invention to provide a micro-coupling using a simple wedging action to interconnect the tubing to the apparatus.

It is a further object of this invention to provide an improved micro-coupling which reduces the galling effect present in prior designs of such couplings.

A still further object of this invention is to provide a micro-coupling which is capable of being used with longitudinally fixed tubing.

Yet another object of this invention is to provide a two piece micro-coupling wherein the dead space in the coupling is minimized.

Briefly summarized, the coupling comprises a tapered gripping element adapted to surround the free end of a piece of tubing and includes an internal shoulder against which the end of the tubing abuts when the gripping element is placed thereover. A threadless nut having a tapered internal surface is adapted to engage a tapered external surface on the gripping element thereby to force the latter radially inwardly into gripping relationship with the tubing, the length of the tapered internal surface of the threadless nut is less than the length of the tapered external surface of the gripping element so that the free end of the gripping element will be disposed within a bore of the threadless nut when the nut is fully advanced over the fitting.

Other and more specific features will become more apparent upon a complete reading of the following description which sets forth in detail one approved means of carrying out the invention. Such disclosed means is not meant to be limiting inasmuch as it constitutes but one of the various ways in which the principles of the invention may be applied.

In the drawings wherein like reference numerals indicate like parts in the various views.

Figure 1:
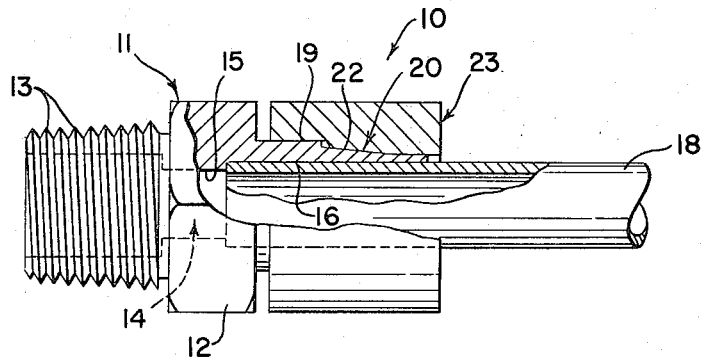
FIG. 1 is a side elevation view, partly in section, showing the micro-coupling in an assembled relation.

Referring now to the drawings, FIG. 1 shows a micro-coupling device indicated generally by the reference numeral 10, which coupling embodies the principles of the instant invention. The coupling 10 includes a coupling body 11 which may be provided intermediate its ends with tool pads 12 or other wrench engaging surfaces. Threads 13 are provided on one end of the body whereby the body may be attached to a suitable supporting base or other means.

Extending longitudinally through the body 11 is a passageway, indicated generally by the reference numeral 14. The passage includes a central bore 15 which opens outwardly of the body 11 through the threaded end 13. A cylindrical bore 16, coaxial with the central bore 15, opens outwardly of the other end of the body. A radially extending shoulder 17 is formed in the body at the juncture of the two bores. The bore 16 is of a diameter which corresponds substantially to the diameter of the outside of a piece of tubing 18 so that tubing placed in the bore 16 is in a close fitting relationship thereto.

The coupling body 11 further includes an external circular cylindrical surface 19 which is adjacent to the tool pads 12 but of a reduced diameter. Extending longitudinally of the body from the surface 19 is a gripping element 20 through which the bore 16 passes. The gripping element 20 is integral with the portion of the body 11 defining the surface 19 and includes an external stepped shoulder 21 at the juncture of the element 20 and the body 11. From the shoulder 21, the external surface 22 of the element 20 is in a radially inwardly tapering configuration.

Figure 2:
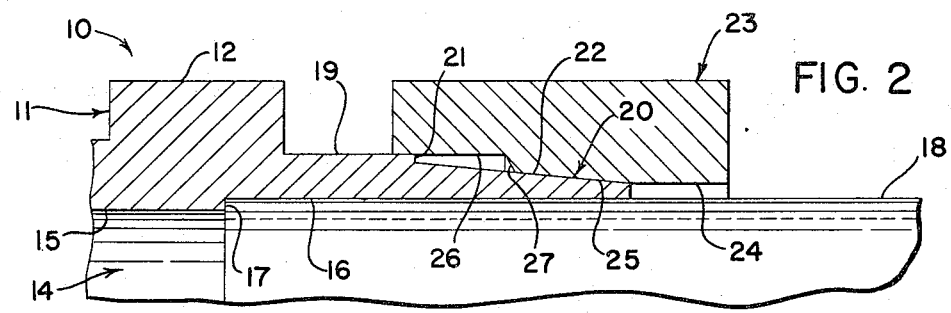
FIG. 2 is a magnified view of a portion of the coupling illustrated in FIG. 1 showing the coupling assembled on the end of the tube but not gripping the tube.

Adapted to cooperate with the body 11 is an annular coupling member 23 which has an external diameter approximately equal to the diameter to the tool pads 12. The annular member 23 includes a central circular cylindrical bore 24 of a diameter greater than the diameter of the tubing thereby permitting the member 23 to be placed over the end of the tubing. As shown in FIG. 2, the diameter of central circular cylindrical bore 24 is substantially equal to the outside diameter of the tube 18 plus twice the transverse thickness of the free end of the gripping element 20. The central bore 24 has a radially outwardly tapering mouth portion 25. The tapered mouth 25 is formed on an angle substantially equal to the angle of the tapered surface 22 on the gripping member 20. As shown in FIG. 2, the length of the tapered mouth 25 is less than the length of the tapered surface 22 of the gripping member 20. A counterbore 26 is formed in one end of the member 23, with a shoulder 27 formed at the juncture of the counterbore and the tapering mouth 25. The diameter of the counterbore is substantially equal to that of the annular surface 19 so that the member 23, when telescoped over the end of the fitting body 11, provides a smooth engagement of the member 23 on the surface 19 while the tapered surface 25 engages the corresponding tapered surface 22.

Figure 3:
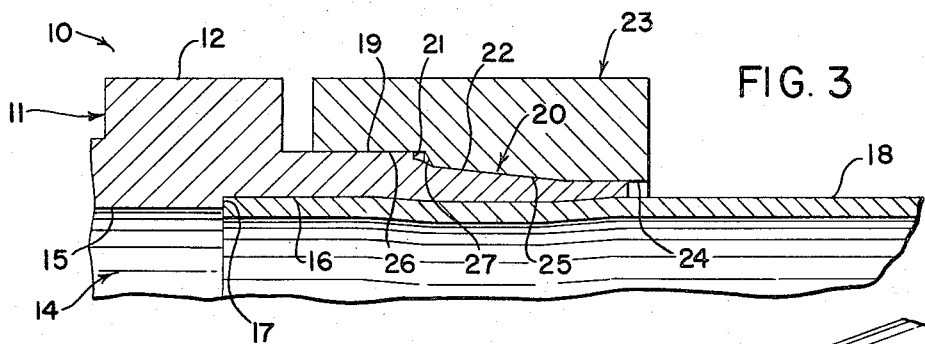
FIG. 3 is a view similar to FIG. 2 showing the tubing in the assembled and gripping position.
Figure 4:
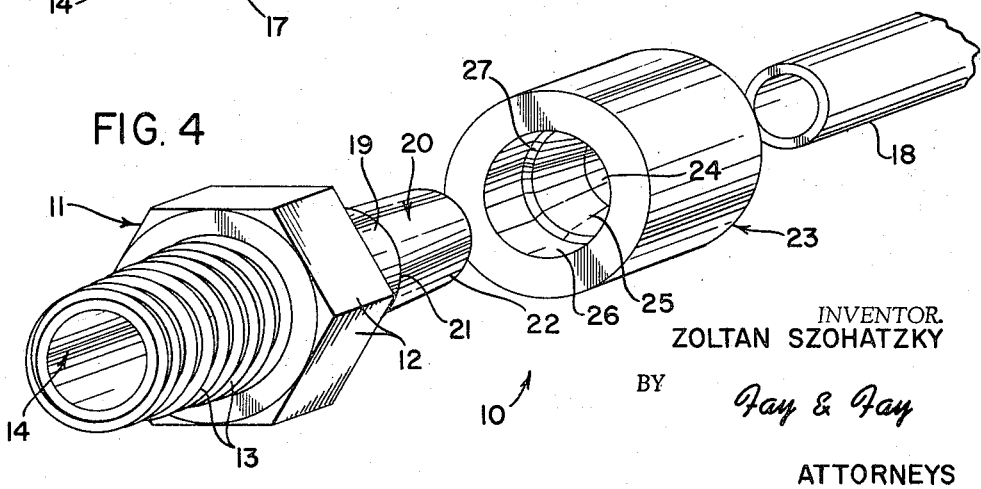
FIG. 4 is an exploded perspective view showing the components of the coupling.

The operation of the coupling is as follows: The annular coupling member 23 is assembled over the free end of a piece of tubing 18. The tubing 18 is then inserted in the bore 16 of the body 11 until the end of the tubing abuts the shoulder 17 in the central passage 15. The member 23 is moved longitudinally of the tubing until the counterbore 26 is being telescopically received over the annular surface 19 and the tapered mouth 25 is in engagement with surface 22. This condition is illustrated in FIG. 2. In this position, the member 23 is then displaced longitudinally of the tubing to the position shown in FIG. 3 wherein the member 23 substantially encompasses the gripping element 20. Due to the relative thickness of the member 23 at the mouth 25 and the relative thin section of the gripping member 20, the gripping member is deformed radially inwardly into frictional engagement with the outer periphery of the tubing 18 as the member 23 is moved longitudinally thereby wedging the tubing in the bore 16 and restraining removal from the coupling. Deformation of the tubing is effective over a substantial area of the tubing wall, as shown in FIG. 3, thereby assuring that the tubing is securely restrained. Since the length of the tapered mouth 25 of the coupling member 23 is less than the length of the tapered surface 22 of the gripping member 20, a full displacement of the coupling member 23 over the body 11, as shown in FIG. 3, causes the free end of the gripping element 20 to be disposed within the central bore 24.

Several features are to be noted. As shown in FIG. 3 in the assembled condition of the coupling, the tubing abuts the shoulder 17 and is in close engagement with the bore 16 thereby obviating the presentation of any dead air spaces to the gas in the system. With this arrangement, it is believed obvious that purging of the system is greatly facilitated.

In addition, a sound leak tight joint is formed by the coupling heretofore described. Thus, through the coaction of the annular surface 19 and the counterbore 26 in the annular member 23, the annular member is guided during its longitudinal movement preventing any tendency of the annular member to tilt, cock or otherwise wedge in an irregular manner and thereby form an imperfect seal between the gripping element 20 and the wall of the tubing.

Since the free end of the gripping element 20, as shown in FIG. 3, is disposed within the central bore 24 of the coupling member 23, any tendency of the free end to bite into the tube to severely constrict and/or cut the tube has been eliminated. The deformation of the gripping element 20 at the interface of tube 18 is a shallow concave surface with little or no deformation at either end of the gripping element. The deformation interface is thus a relatively smooth curve free of abrupt changes in direction that would constrict or cut the surface of the tube.

Finally, it is to be noted that the tubing need not be displaced longitudinally during the assembly operation since it is sufficient to fit the coupling body 11 over the end of the tubing and the coupling member 23 coacts solely with the body 11 to accomplish the coupling function.

Additional modifications and changes will suggest themselves to those having ordinary skill in the art. Changes such as these are contemplated by the principles of this invention so that although for ease of description, the principles of the invention have been set forth in connection with but a single illustrated embodiment, it is not intended that this embodiment or the terminology employed in describing it is to be limiting. Rather, it is my desire to be restricted only by the scope of the appended claims.

I claim:
1. A coupling comprising:
a body member having a fluid passageway therethrough about a longitudinal axis,
said body including an external circular cylindrical surface having an axis coincident said longitudinal axis,
a longitudinally extending gripping element integral with said body including a circular cylindrical bore coextensive with said fluid passageway, said bore being adapted to receive a piece of tubing therein,
said gripping element including a tapered surface on the exterior surface thereof extending from said body to a free end of said gripping element,
an annular coupling member having a circular cylindrical bore therethrough having a diameter substantially equal to the outside diameter of the tube to be received therein plus twice the transverse thickness of the free end of said gripping element,
a counterbore in one end of said annular coupling member having a diameter substantially equal to the diameter of said external cylindrical surface,
a tapered mouth portion in said annular coupling member interconnecting said counterbore with said bore of said coupling member and complemental to said tapered surface of said gripping element, the length of said tapered mouth portion being less than the length of said tapered surface,
whereby, with said coupling member received over the end of a piece of tubing and the tubing inserted in the bore in said gripping element, advancement of said coupling member over said external cylindrical surface produces mating engagement of said tapered surface and said mouth portion to deform said gripping element into engagement with the exterior of the tubing, the free end of said gripping element being received within said bore of said annular cou- pling member in the deformed state and having an outside diameter substantially equal to the diameter of said bore of said annular coupling member in said deformed state.

References Cited

UNITED STATES PATENTS

| | | | |
|---|---|---|---|
| 906,099 | 12/1908 | Burgess | 285—382.2 X |
| 1,064,154 | 6/1913 | Miller | 285—255 |
| 2,098,581 | 11/1937 | Jones | 285—322 X |
| 2,457,648 | 12/1948 | Donner | 285—323 |
| 2,458,833 | 1/1949 | Carignan | 285—382.7 X |
| 3,103,373 | 9/1963 | Lennon et al. | 285—382.7 X |
| 3,149,860 | 9/1964 | Hallesy | 285—382 X |

FOREIGN PATENTS

| | | |
|---|---|---|
| 1,169,899 | 9/1958 | France. |
| 1,207,150 | 8/1959 | France. |
| 379,855 | 9/1964 | Switzerland. |

CARL W. TOMLIN, *Primary Examiner.*

THOMAS F. CALLAGHAN, *Examiner.*